United States Patent [19]

Pearce

[11] Patent Number: 5,455,331

[45] Date of Patent: Oct. 3, 1995

[54] ENRICHED WHEY PROTEIN FRACTIONS AND METHOD FOR THE PRODUCTION THEREOF

[75] Inventor: Robert J. Pearce, Beaumaris, Australia

[73] Assignee: Commonwealth Scientific and Industrial Research Organisation, Australian Capital Territory, Australia

[21] Appl. No.: 76,702

[22] Filed: Jun. 15, 1993

Related U.S. Application Data

[63] Continuation of Ser. No. 439,045, filed as PCT/AU88/00141 May 13, 88, abandoned.

[30] Foreign Application Priority Data

May 14, 1987 [AU] Australia .............................. PI 1886/87

[51] Int. Cl.$^6$ .............................. C07K 1/34; C07K 14/47; C07K 14/76
[52] U.S. Cl. .......................... 530/366; 530/386; 530/414; 530/833
[58] Field of Search ..................................... 530/350, 365, 530/366, 369, 386, 395, 414, 424, 833

[56] References Cited

U.S. PATENT DOCUMENTS

| | | | |
|---|---|---|---|
| 2,023,014 | 12/1935 | Flanigan et al. | 530/365 |
| 4,485,040 | 11/1984 | Roger et al. | 530/366 |
| 4,782,138 | 11/1988 | Rialland et al. | 530/410 |

FOREIGN PATENT DOCUMENTS

| | | |
|---|---|---|
| 7771981 | 5/1986 | Australia . |
| 5887686 | 12/1986 | Australia . |
| 143966 | 12/1969 | New Zealand . |
| 216567 | 6/1986 | New Zealand . |
| 1402977 | 8/1975 | United Kingdom . |

OTHER PUBLICATIONS

Harwalkar, Milchwissenschaft vol. 41 (4) pp. 206–209 (1986).

Amundson et al., J. Food Process Preserv. vol. 6 (2) pp. 55–72 (1982).

Pearce, R. J., "Fractionation of Whey Proteins" *Australian Journal of Dairy Technology*, vol. 2298, No. 42, 75–78 (1987).

Pearce, R. J., "Thermal Separation of β–Lactoglobulin and α–Lactalbumin in Bovine Cheddar Cheese Whey", *Australian Journal of Dairy Technology*, vol. 38, 144–148 (Dec. 1983).

Patent Abstracts of Japan, JP–61–268138, C–417, p. 142, Nov. 27, 1986.

*Primary Examiner*—Jeffrey E. Russel
*Attorney, Agent, or Firm*—Sughrue, Mion, Zinn, Macpeak & Seas

[57] ABSTRACT

Whey protein fractions, especially alpha-lactalbumin and beta-lactoglobulin, are produced by a process which comprises the steps of: (a) treating the whey to achieve a reduction in the specific gravity and ionic strength of the whey to levels which should not be less than 25% of their original values; (b) adjusting the pH of the whey to a value in the range 3.80 to 5.50 by the addition of acid; the above steps being carried out in any order; (c) heating the pH-adjusted whey to a temperature in the range 55°–70° C., and maintaining the whey at that temperature for a period greater than 30 seconds and sufficient to permit aggregation of a portion of the protein content of the whey; (d) cooling the whey to a temperature less than 55° C., and maintaining the whey at that temperature for a period of time sufficient to permit flocculation of the aggregated protein; (e) separating the aggregated protein containing alpha-lactalbumin from the mother liquor; and (f) optionally, recovering beta-lactoglobulin and/or other soluble proteins from the mother liquor.

35 Claims, 1 Drawing Sheet

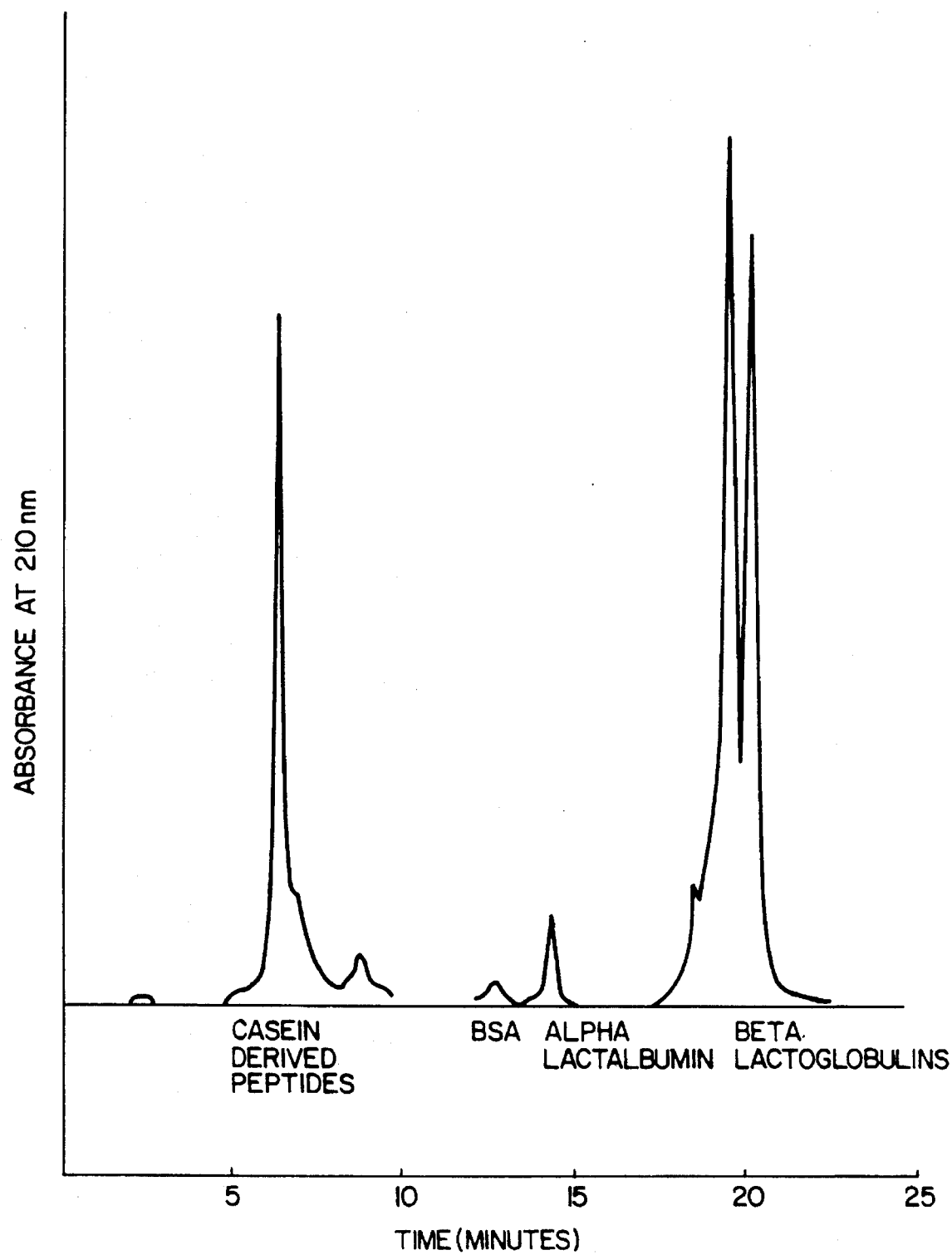
FIGURE

ENRICHED WHEY PROTEIN FRACTIONS AND METHOD FOR THE PRODUCTION THEREOF

This is a continuation of application Ser. No. 07/439,045 filed Nov. 17, 1989 (abandoned).

This invention relates to a method for the production of whey protein fractions and, more specifically, to the manufacture of enriched alpha-lactalbumin and enriched beta-lactoglobulin fractions from dairy whey.

Whey is the by-product from the manufacture of dairy products which utilise the casein portion of the total milk proteins. In normal commercial practice the whey is separated and clarified to recover free fat and fine particulate casein. The result is a slightly opaque solution of proteins (the "whey proteins"), lactose, minerals and a small amount of fat in a form which is not removable directly by centrifugation and is responsible for the slight opaqueness of the whey.

Ultrafiltration technology has been applied to whey to concentrate the protein with respect to the lactose and mineral contents. Whey protein concentrates (WPC) having protein contents in the range of 35–80% in the dried product are produced commercially. Application of WPC has been limited by its functional properties. For example, the residual fat has been implicated in the instability of food foams containing WPC. A commercially viable method for the fractionation of the major whey proteins, alpha-lactalbumin and beta-lactoglobulin, has been sought for some time to enable exploitation of the individual properties of these two proteins. Amundson et al (Journal of Food Processing and Preservation, 6, 55–71, 1982) have described a method using ultrafiltration and electrodialysis to precipitate the beta-lactoglobulin from whey.

Novel properties of alpha-lactalbumin, which allow it to be separated from beta-lactoglobulin have been recently described, together with an hypothesis for the biochemical mechanism by Pearce (Australian Journal of Dairy Technology 38, 144–148, 1983). However, the laboratory scale separation methodology described was not applicable in a commercial process.

BRIEF DESCRIPTION OF THE DRAWINGS

FIG. 1 is a high performance liquid chromatograph (HPLC) plot of enriched beta-lactoglobulin prepared from cheddar cheese whey in accordance with the invention.

DETAILED DESCRIPTION OF THE INVENTION

The present invention seeks to provide a process for the manufacture of enriched alpha-lactalbumin and enriched beta-lactoglobulin fractions which is based on the methodology of Pearce (see reference above) but which is capable of being operated in a commercial environment.

Using such a process, in accordance with the present invention, on whey and whey concentrated by ultrafiltration it is found that not only may the alpha-lactalbumin be separated from the beta-lactoglobulin as previously described, but also that other components of the whey are separated using the process. Thus, it is found that lipid containing components co-aggregate with the alpha-lactalbumin leaving beta-lactoglobulin together with other non-aggregating soluble proteins and peptides in solution.

According to the present invention there is provided a process for the production of whey protein fractions which comprises the steps of:

(a) treating the whey to achieve a reduction in the specific gravity and ionic strength of the whey to levels which should not be less than 25% of their original values;

(b) adjusting the pH of the whey to a value in the range 3.80 to 5.50, typically 4.1 to 4.4, preferably 4.3, by the addition of acid; the above steps being carried out in any order.

(c) heating the pH-adjusted whey to a temperature in the range 55°–70° C., optimally 64°±1° C., and maintaining the whey at that temperature for a period greater than 30 seconds, typically about 10 minutes, and sufficient to permit aggregation of a portion of the protein content of the whey;

(d) cooling the whey to a temperature less than 55° C., typically about 50° C., and maintaining the whey at that temperature for a period of time, typically about 10 minutes, sufficient to permit flocculation of the aggregated protein;

(e) separating the aggregated protein containing alpha-lactalbumin from the mother liquor; and (f) if desired, recovering beta-lactoglobulin and/or other soluble proteins from the mother liquor.

The final values of specific gravity and ionic strength after treatment in step (a) should be 25% or more of their original values, preferably from 25% to 90%, more preferably from 25% to 75%, most preferably about 50%.

Whey derived from any source that has not been subjected to any treatment sufficient to cause denaturation of the beta-lactoglobulin during its production may be utilised in the method of the invention. Whey, derived from product manufacture which utilises adventitious and/or added microflora, should be treated to inhibit further microbial activity. The whey should be treated to substantially remove fat and fine particulate matter. The thus treated whey may be concentrated by ultrafiltration or other means to increase the protein content with respect to permeable components.

The preferred method of reducing specific gravity and ionic strength of the whey or concentrated whey is by diafiltration using a batchwise or continuous procedure.

If the whey has a higher protein content than normal (due to some previous treatment) a similar result may be achieved by addition of an amount of water sufficient to achieve the required reduction in ionic strength and specific gravity. This may be added at any stage prior to separation of the protein fractions but is preferred after pH adjustment and heat treatment.

During the pH adjustment, the addition of acid should be carried out with vigorous mixing to avoid local high concentrations of acid. Hydrochloric, phosphoric, citric or any other suitable acid may be used for pH adjustment, dependent on product application. The concentration of the acid added is not critical but with regard to ease of addition, final volumes and effectiveness of mixing, typically 8% hydrochloric acid is preferred.

Separation of the insoluble phase from the soluble phase may be achieved by methods which rely on either the relative specific gravities of the soluble and insoluble particles, or the relative sizes of the particles, or other relative properties. Centrifugation in a continuous or discontinuous process may be utilised, as may filtration through an appropriate medium with the required porosity, typically using microfiltration with porosity in the range 0.1 to 10 microns.

The recovered aggregated protein is designated 'enriched alpha-lactalbumin' or 'ALPHA-fraction'; the protein contained in the recovered, clarified liquid phase is designated 'enriched beta-lactoglobulin' or 'BETA-fraction'.

The alpha-fraction may be further enriched by washing the recovered protein aggregate to remove entrapped mother liquor. Washing may be carried out either by resuspension of the aggregated phase followed by recollection or by a diafiltration process using water or other aqueous medium for the purpose. Water, dilute acid or other aqueous solutions which will not result in dissolution of the insolubilized protein may be utilised. The alpha-fraction may be concentrated further if necessary and dried.

Alpha-fraction may be further purified by dispersion of the washed protein aggregate in water or other aqueous solvent and adjustment of the pH to a pH greater than 5.5, typically pH 7.0 in order to resolubilize the alpha-lactalbumin and leave a residue of undissolved and insoluble protein. Since denaturation of alpha-lactalbumin is accompanied by loss of calcium from the native protein, addition of calcium or other divalent ions may be advantageous to the renaturation and solubilization of the alpha-lactalbumin. Separation of such resolubilized components of the alpha-fraction from insoluble material by centrifugation or filtration yields a soluble fraction further enriched in alpha-lactalbumin designated 'ALPHA-ISOLATE' and a residue, designated 'ALPHA-LIPID', containing the aggregated, high lipid-containing material together with insoluble protein.

'Alpha-fraction' may be defined in terms of its content of alpha-lactalbumin and lipid- protein aggregate content precipitable under the conditions of pH-adjustment and heat treatment described above for the manufacture of alpha-fraction relative to the non-precipitable protein. A product is deemed to be 'alpha-fraction' if such product:

has a content of such precipitable protein in excess of 35% of the total protein;

the precipitable protein not including entrapped soluble protein, contains less than 5% of beta-lactoglobulin as determined by the technique of polyacrylamide gel electrophoresis in sodium dodecyl sulphate as described by Andreas Chrambach ("The Practice of Quantitative Gel Electrophoresis". Weinheim, Deerfield Beach, Fla.: VCH, 1985); and displays characteristics of partial resolubilization of the precipitable protein when the pH is adjusted to within the range 6.5 to 7.5 when the resolubilized protein may be shown to be predominantly alpha-lactalbumin by polyacrylamide gel electrophoresis or other technique appropriate for the identification of proteins from milk.

The 'beta-fraction' may be further concentrated and enriched by techniques appropriate for the removal of lactose, minerals, and/or water, for example, ultrafiltration. Addition of water and/or aqueous solutions may be used before or during the ultrafiltration process to achieve further purification and/or selection of the non-protein composition of the final product. The pH may be adjusted before and/or after this enrichment step to a value as required and the products further concentrated by any suitable process, such as evaporation, and then dried.

'Beta-fraction' may be defined in terms of its content of and the relative proportions of beta-lactoglobulin and other soluble proteins and peptides not precipitable under the conditions of pH adjustment and heat treatment described herein for the manufacture of beta-fraction relative to the precipitable protein together with its ability to form aqueous gels of high strength under defined conditions. A product is deemed to be beta-fraction if such product: has a content of such non-precipitable protein in excess of 75% of the total protein and, of which non-precipitable protein, not less than one tenth part represents soluble peptides derived from the casein proteins;

has a content of alpha-lactalbumin representing not more than 10% of the total protein as determined by the technique of high performance liquid chromatography described in Pearce, (Australian Journal of Dairy Technology, 38, 144–148, 1983) and exemplified in the chromatogram depicted in Example 5 and FIG. 1; and displays the characteristic of gel breaking strength greater than 200 grams when evaluated by the technique of Furukawa et al. (U.S. Pat. No. 4,460,615). That is, various solutions containing the improved whey proteins at a protein concentration of 9.4% are prepared which are put in a casing having a diameter of 3 cm, heated at 90° C. for thirty minutes and cooled. The breaking strength of the thus obtained gel is measured on each occasion by using a Rheometer (commercial product of Fuji Rika K.K., Japan).

The invention is further described and illustrated by the following non-limiting examples.

EXAMPLE 1

3500 L of clarified, separated, pasteurized Cheddar cheese whey was concentrated by ultrafiltration in a four stage, stages-in-series, ultrafiltration plant. In the first two stages approximately 7-fold concentration of the whey protein was achieved; in the last two stages demineralized water was added for diafiltration of the concentrated whey in quantities sufficient to achieve a total solids content in the final stage permeate equivalent to 50% of that in the first stage permeate. The 500 L of whey concentrate so obtained was pumped at about 200 L per hour first through a device in which hydrochloric acid (8% w/v) was added and rapidly mixed to achieve a final pH of 4.3, the pH being continuously monitored. The pH-adjusted, concentrated whey was then passed through a tubular heat exchanger in which the temperature was slowly increased to 64°±1° C. and then through a tube maintained at the same temperature of length equivalent to a residence time of 6 minutes. The whey was cooled to 50° C. in a second tubular heat exchanger and collected in an insulated vat fitted with agitating paddles rotated at 20 r.p.m. After an average residence time in the vat of 10 minutes, the whey was pumped at 200 L/hr through a continuous, self-desludging clarifier. The sedimented protein fraction was discharged periodically after flushing the clarifier bowl with water to minimise contamination of the sedimented protein with mother liquor. The clarified supernatant liquor was collected and reclarified.

The sedimented protein fraction was concentrated by evaporation under reduced pressure to approximately 30% w/w total solids content and spray dried. The reclarified supernatant protein fraction was further concentrated by ultrafiltration and the lactose and ash contents reduced further by diafiltration so that the final retentate and permeate contained 16% and 1% total solids respectively. The retentate was evaporated in a falling film evaporator to approximately 25% total solids and then spray dried.

The results are shown in Table 1.

EXAMPLE 2

In this example, the 'high-protein whey' to be processed was derived from Cheddar cheese manufacture utilising milk concentrated by ultrafiltration in accordance with the method described in British Patent No. 2,138,264. 500 L of this whey containing approximately 12% w/w total solids and 7% w/w of protein was thoroughly clarified and separated and pasteurized. The pH of the whey was adjusted continuously and heated and cooled as in Example 1. Prior to collection of the heat treated whey, demineralized water at the same temperature as the whey (50° C.) was added at a T-intersection at an appropriate flow rate to achieve the required reduction of the ionic strength and specific gravity to facilitate protein precipitation. After an average residence time of about 10 minutes the aggregated and soluble protein fractions were separated and collected as in Example 1.

The results are shown in Table 2.

EXAMPLE 3

In this example 3500 L of clarified, separated, pasteurized Cheddar cheese whey was concentrated by ultrafiltration as in Example 1. The 500 L of whey concentrate so obtained was acidified to a final pH of 4.3 and heat treated as in Example 1. The whey emerging at 50° C. was mixed at a T-intersection with demineralized water also at 50° C. to achieve the required dilution level as in Example 2. The diluted whey was collected in a vat and after an average residence time of 10 minutes at 50° C. the aggregated protein and soluble fractions were separated and collected as in Example 1.

The results are shown in Table 3.

EXAMPLE 4

In this example 3500 L of clarified, separated, pasteurized Cheddar cheese whey was concentrated by ultrafiltration as in Example 1. The 500 L of whey concentrate so obtained was acidified to a final pH of 4.3 and heat treated as in Example 1.

In a batch-type plant, 320 L of pH-adjusted, heat treated whey concentrate was separated using a microfiltration membrane system having 0.2 micron porosity into an alpha-fraction, the retentate, and an beta-fraction, the permeate. Permeate was collected until 80 L of retentate remained. The beta-fraction was processed by ultrafiltration to yield concentrated protein in a further retentate and a further permeate containing only lactose, salts and other small soluble components. This permeate was then used to further purify the alpha-fraction by addition to the microfiltration system in a diafiltration process to enable purification by further removal of soluble protein while maintaining the non-protein composition of the enriched alpha-fraction.

The products obtained were comparable to those in Examples 1,2 and 3.

EXAMPLE 5

High performance liquid chromatography of beta-fraction, prepared according to Example 3, was carried out according to the method of Pearce (Australian Journal of Dairy Technology, 38, 144–148, 1983).

The results are shown in Table 4 and FIG. 1.

EXAMPLE 6

Beta-fraction was tested, according to a modification of the method of Furakawa et al., for the evaluation of gel breaking strength as a function of protein concentration. Product was dissolved in water at concentrations in the range 6.5 to 12.0 with respect to protein content and the pH adjusted to a value of 6.80. The solution was sealed inside dialysis tubing having wet diameter of 30 mm and then placed in a water bath at 90° C. for 30 minutes. After cooling first under running tap water and then in a refrigerator at 5° C. each for 1 hour, it was equilibrated at 25° C. for 1 hour. The resulting heat-set gel was sliced into 30 mm cylindrical pieces and the gel breaking strength in gram. measured using a Fudoh Rheometer (Fudoh Kogyo Co., Ltd.) using a 10 mm diameter flat circular probe and a probe speed set at 60 mm/min.

Results are shown in Table 5.

TABLES (1) Fractionation of Cheddar Cheese Whey Proteins After the Processes of Ultrafiltration and Diafiltration (Example 1).

| Sample | Total Kjeldahl nitrogen content (mg/L) |
| --- | --- |
| Whey concentrate after UF | 69.8 |
| Whey permeate after UF Stage one | 2.84 |
| Whey permeate after UF Stage four | 1.50 |
| Whey concentrate after adjustment of pH | 69.4 |
| Supernatant after clarification | 50.8 |

Effective dilution by diafiltration = 47%
Proportion of total protein in supernatant (Beta fraction) = 73.1%
Proportion of total protein in precipitate (Alpha fraction) = 26.9%

(2) Fractionation of Whey Proteins From High-Protein Whey Utilizing Direct Dilution (Example 2).

| Sample | Total Kjeldahl nitrogen content (mg/L) |
| --- | --- |
| High protein, separated, clarified whey | 51.4 |
| Whey after pH adjustment | 50.4 |
| Whey after dilution by addition of water | 19.0 |
| Supernatant after clarification | 12.2 |

Effective dilution by addition of water = 62%
Proportion of total protein in supernatant (Beta fraction) = 64.2%
Proportion of total protein in precipitate (Alpha fraction) = 35.8%

(3) Fractionation of Cheddar Cheese Whey Proteins After Concentration by Ultrafiltration and Direct Dilution (Example 3).

| Sample | Total Kjeldahl nitrogen content (mg/L) |
| --- | --- |
| Whey concentrate after UF stage four | 74.7 |
| Whey concentrate after adjustment of pH | 73.2 |
| Whey concentrate after dilution by addition of water | 36.4 |
| Supernatant after clarification | 28.2 |

Effective dilution by addition of water = 50%
Proportion of total protein in supernatant (Beta fraction) = 76.4%
Proportion of total protein in precipitate (Alpha fraction) = 23.6%

(4) Major HPLC Features (Example 5).

| Peak Retention Time (minutes) | Peak Identification | Proportion of Total % |
| --- | --- | --- |
| 6.4–9.5 | Casein derived peptides | 25.6 |
| 12.9 | Bovine serum albumin | 1.3 |

(4) Major HPLC Features (Example 5).

| Peak Retention Time (minutes) | Peak Identification | Proportion of Total % |
| --- | --- | --- |
| 14.5 | Alpha-lactalbumin | 2.5 |
| 19.8–20.5 | Beta-lactoglobulins (A and B variants) | 70.6 |

(5) Gel Breaking Strength of Beta-fraction (Example 6).

| Protein Concentration (% w/w) | Gel Breaking Strength (g) |
| --- | --- |
| <6.75 | not measurable |
| 7.0 | 112 |
| 7.5 | 218 |
| 8.0 | 424 |
| 8.5 | 632 |
| 9.0 | 776 |
| 10.0 | 1066 |
| 12.0 | 1800 |

I claim:

1. A process for the production of whey protein fractions comprising the steps of:
   (a) treating whey to achieve a reduction in the specific gravity and ionic strength of the whey to levels of from 75% to 10% of their original values;
   (b) adjusting the pH of the whey to a value in the range of 3.80 to 5.50 by the addition of acid; wherein steps (a) and (b) can be carried out in any order;
   (c) heating the pH-adjusted whey to a temperature in the range of 55°–70° C., and maintaining the whey at that temperature for a period greater than 30 seconds and sufficient to permit aggregation of a portion of the protein content of the whey;
   (d) cooling the whey to a temperature less than 55° C., and maintaining the whey at that temperature for a period of time sufficient to permit flocculation of the aggregated protein; and
   (e) separating the aggregated protein containing alpha-lactalbumin, termed the alpha-fraction, from the mother liquor to recover an alpha-fraction product.

2. A process as claimed in claim 1, wherein in step (a) the reduction in the specific gravity and ionic strength is from 75% to 25%.

3. A process as claimed in claim 1, wherein in step (a) the reduction in the specific gravity and ionic strength is about 50%.

4. A process as claimed in claim 1, wherein in step (b) the pH is adjusted to a value in the range of 4.1 to 4.4.

5. A process as claimed in claim 4, wherein the pH is adjusted to about 4.3.

6. A process as claimed in claim 1, wherein in step (c) the whey is heated to 64°±1° C.

7. A process as claimed in claim 1, wherein in step (d) the whey is cooled to about 50° C.

8. A process as claimed in claim 1, wherein the whey is initially concentrated by ultrafiltration.

9. A process as claimed in claim 1, wherein in step (a) the reduction in the specific gravity and ionic strength of the whey is achieved by diafiltration.

10. A process as claimed in claim 1, further comprising step (f) wherein the alpha-fraction product obtained in step (e) is further purified by washing it with an aqueous solution to remove entrapped mother liquor.

11. A process as claimed in claim 10, wherein in step (f) the washing is by resuspension in an aqueous solution.

12. A process as claimed in claim 10, wherein in step (f) the washing is by diafiltration against an aqueous solution.

13. A process as claimed in claim 10, further comprising step (g) wherein the alpha-fraction product is further purified by dispersing the alpha-fraction product in an aqueous solution, adjusting the pH to greater than 5.5, and separating a soluble phase which contains the alpha-lactalbumin-enriched alpha-fraction from insoluble material thereby to yield an alpha-fraction from the soluble phase and a residue containing aggregated, lipid-containing material together with insoluble protein.

14. A process as claimed in claim 13, wherein the pH of the aqueous dispersion of alpha-fraction product is adjusted to about 7.

15. A process as claimed in claim 13, wherein calcium or other divalent ions are added to the aqueous solution in order to ensure renaturation and solubilization of the alpha-lactalbumin.

16. A process as claimed in claim 1, wherein after step (e) the mother liquor is treated to remove at least part of at least one of the lactose, minerals and water present to produce a beta-fraction product.

17. A process as claimed in claim 16, wherein the removal of at least one of the lactose, minerals and water is effected by ultrafiltration.

18. A process as claimed in claim 17, wherein an aqueous solution is added to the mother liquor before or during the ultrafiltration step.

19. A process as claimed in any one of claims 16 to 18, wherein the pH of the mother liquor or the concentrated solution is adjusted at a time selected from at least one of before and after the removal of at least one of the lactose, minerals and water.

20. A process for the production of whey protein fractions comprising the steps of:
   (a) treating the whey by diafiltration to achieve a reduction in the specific gravity and ionic strength of the whey to about 50% of their original values;
   (b) adjusting the pH of the whey to about 4.3 by the addition of acid;
   wherein steps (a) and (b) can be carried out in any order;
   (c) heating the pH-adjusted whey to 64°±1° C., and maintaining the whey at that temperature for a period of time greater than 30 seconds and sufficient to permit aggregation of a portion of the protein content of the whey;
   (d) cooling the whey to about 50° C., and maintaining the whey at that temperature for a period of time sufficient to permit flocculation of the aggregated protein; and
   (e) separating the aggregated protein containing alpha-lactalbumin from the mother liquor.

21. A process as claimed in claim 1 further comprising, after step (e), recovering beta-lactoglobulin from the mother liquor.

22. A process as claimed in claim 1 further comprising, after step (e), recovering beta-lactoglobulin and other soluble proteins from the mother liquor.

23. A process as claimed in claim 1 further comprising, after step (e), recovering soluble proteins other than beta-lactoglobulin from the mother liquor.

24. A process as claimed in claim 20 further comprising, after step (e), recovering beta-lactoglobulin from the mother liquor.

25. A process as claimed in claim 20 further comprising, after step (e), recovering beta-lactoglobulin and other soluble proteins from the mother liquor.

26. A process as claimed in claim 20 further comprising, after step (e), recovering soluble proteins other than beta-lactoglobulin from the mother liquor.

27. A process as claimed in claim 13, wherein the pH of the aqueous dispersion of the alpha-fraction product is adjusted within a range of 6.5 to 7.5.

28. A process as claimed in claim 10, wherein the aqueous solution is water.

29. A process as claimed in claim 11, wherein the aqueous solution is water.

30. A process as claimed in claim 12, wherein the aqueous solution is water.

31. A process as claimed in claim 13, wherein the aqueous solution is water.

32. A process as claimed in claim 18, wherein the aqueous solution is water.

33. A process for the production of whey protein fractions wherein the whey feedstock has an initial protein content greater than that for unconcentrated whey, said process comprising:

(a) adjusting the pH of the whey to a value in the range of 3.80 to 5.50 by the addition of acid;

(b) heating the pH-adjusted whey to a temperature in the range of 55°–70° C., and maintaining the whey at that temperature for a period greater than 30 seconds and sufficient to permit aggregation of a portion of the protein content of the whey;

(c) cooling the whey to a temperature less than 55° C., and maintaining the whey at that temperature for a period of time sufficient to permit flocculation of the aggregated protein; and (d) separating the aggregated protein containing alpha-lactalbumin, termed the alpha-fraction, from the mother liquor to recover an alpha-fraction product wherein, at any time from prior to step (a) to prior to step (d) the whey is treated to achieve a reduction in the specific gravity and ionic strength of the whey to levels of from 75% to 10% of their original values by addition of water.

34. The process of claim 33, wherein the pH in step (a) is adjusted to 4.1 to 4.4.

35. The process of claim 33, wherein the pH in step (a) is adjusted to about 4.3.

* * * * *